US011368629B2

(12) United States Patent
Masuda et al.

(10) Patent No.: US 11,368,629 B2
(45) Date of Patent: Jun. 21, 2022

(54) IMAGE CAPTURING APPARATUS, CONTROL METHOD FOR IMAGE CAPTURING APPARATUS, AND CONTROL PROGRAM FOR IMAGE CAPTURING APPARATUS FOR CONTROLLING EXPOSURE OF REGION HAVING DIFFERENT BRIGHTNESS

(71) Applicant: FUJIFILM Corporation, Tokyo (JP)

(72) Inventors: Tomonori Masuda, Saitama (JP);
Masahiko Sugimoto, Saitama (JP);
Kosuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 405 days.

(21) Appl. No.: 16/667,894

(22) Filed: Oct. 29, 2019

(65) Prior Publication Data
US 2020/0068107 A1 Feb. 27, 2020

Related U.S. Application Data

(63) Continuation of application No. PCT/JP2018/014246, filed on Apr. 3, 2018.

(30) Foreign Application Priority Data

Jun. 8, 2017 (JP) .............................. JP2017-113493

(51) Int. Cl.
*H04N 5/228* (2006.01)
*H04N 5/235* (2006.01)
*G06T 7/11* (2017.01)

(52) U.S. Cl.
CPC ............. *H04N 5/2351* (2013.01); *G06T 7/11* (2017.01); *G06T 2207/10144* (2013.01)

(58) Field of Classification Search
CPC .................... H04N 5/2351; G06T 7/11; G06T 2207/10144
(Continued)

(56) References Cited

U.S. PATENT DOCUMENTS 9,270,899 B1 * 2/2016 Ivanchenko ............ G06T 7/194
9,319,594 B2 4/2016 Iwasaki
(Continued)

FOREIGN PATENT DOCUMENTS

JP  2007110638  4/2007
JP  2015136087  7/2015
(Continued)

OTHER PUBLICATIONS

"International Search Report (Form PCT/ISA/210) of PCT/JP2018/014246", dated May 22, 2018, with English translation thereof, pp. 1-4.
(Continued)

*Primary Examiner* — Usman A Khan
(74) *Attorney, Agent, or Firm* — JCIPRNET

(57) ABSTRACT

An image capturing apparatus includes: an image capturing unit that includes an imaging device and outputs an image signal obtained by image capturing of a subject by the imaging device through an image capturing optical system; a control unit that, in a case of controlling an exposure for each of three or more division regions obtained by dividing an image represented by the image signal and in a case of dividing the image into a plurality of segment regions that are different from the division regions and among which a segment region extends across a boundary between some of the division regions, controls an exposure of the segment region in accordance with information about at least one division region among the some of the division regions over which the segment region extends; and a display unit that
(Continued)

displays the image for which the exposure is controlled by the control unit.

20 Claims, 9 Drawing Sheets

(58) Field of Classification Search
USPC .................................................... 348/222.1
See application file for complete search history.

(56) References Cited

U.S. PATENT DOCUMENTS

| | | | |
|---|---|---|---|
| 2007/0133880 A1* | 6/2007 | Sun ........................... | G06T 7/90 |
| | | | 382/195 |
| 2010/0053375 A1* | 3/2010 | Nagata ............... | H04N 5/23229 |
| | | | 348/E9.053 |
| 2017/0310887 A1* | 10/2017 | Fujio ...................... | H04N 5/341 |

FOREIGN PATENT DOCUMENTS

| | | |
|---|---|---|
| JP | 2016015599 | 1/2016 |
| JP | 2016039614 | 3/2016 |
| JP | 2016072896 | 5/2016 |
| JP | 2016092518 | 5/2016 |
| JP | 2016187172 | 10/2016 |

OTHER PUBLICATIONS

"Written Opinion of the International Searching Authority (Form PCT/ISA/237) of PCT/JP2018/014246", dated May 22, 2018, with English translation thereof, pp. 1-9.

\* cited by examiner

IMAGE CAPTURING APPARATUS, CONTROL METHOD FOR IMAGE CAPTURING APPARATUS, AND CONTROL PROGRAM FOR IMAGE CAPTURING APPARATUS FOR CONTROLLING EXPOSURE OF REGION HAVING DIFFERENT BRIGHTNESS

CROSS-REFERENCE TO RELATED APPLICATIONS

This application is a Continuation of PCT International Application No. PCT/JP2018/014246 filed on Apr. 3, 2018, which claims priority under 35 U.S. § 119(a) to Japanese Patent Application No. 2017-113493 filed on Jun. 8, 2017. Each of the above application(s) is hereby expressly incorporated by reference, in its entirety, into the present application.

BACKGROUND OF THE INVENTION

1. Field of the Invention

A technique of the present disclosure relates to an image capturing apparatus, a control method for an image capturing apparatus, and a control program for an image capturing apparatus.

2. Description of the Related Art

For an image capturing apparatus in which image capturing of a photographic subject is performed by an imaging device through an image capturing optical system, a technique for performing image capturing through an ND (neutral density) filter is known. As a technique for attaining an effect equivalent to that attained by providing a physical ND filter in the image capturing optical system, a technique called a digital ND filter process (hereinafter simply referred to as "ND filter process") is known. A technique in which a digital ND filter (hereinafter simply referred to as "ND filter") is used to control the exposure of an image obtained by image capturing by the imaging device for each of a plurality of regions is known. For example, JP2016-187172A, JP2016-72896A, and JP2015-136087A disclose a technique in which an image captured by an imaging device is divided into a plurality of regions, and the exposure is controlled for each division region.

SUMMARY OF THE INVENTION

JP2016-187172A, JP2016-72896A, and JP2015-136087A described above disclose the technique for controlling the exposure of an image obtained by image capturing by the imaging device for each division region; however, there may be a case where it is not possible to control the exposure for a region corresponding to a photographic subject so as to make the exposure suitable to the photographic subject.

The present disclosure has been made in view of the above-described circumstances, and an object thereof is to provide an image capturing apparatus, a control method for an image capturing apparatus, and a control program for an image capturing apparatus with which it is possible to perform exposure control suitable to the photographic subject.

To achieve the above-described object, an image capturing apparatus according to a first aspect of the present disclosure includes: an image capturing unit that includes an imaging device and outputs an image signal obtained by image capturing of a photographic subject by the imaging device through an image capturing optical system; a control unit that, in a case of controlling an exposure for each of three or more division regions obtained by dividing an image represented by the image signal and in a case of dividing the image into a plurality of segment regions that are different from the division regions and among which a segment region extends across a boundary between some of the division regions, controls an exposure of the segment region in accordance with information about at least one division region among the some of the division regions over which the segment region extends; and a display unit that displays the image for which the exposure is controlled by the control unit.

With the image capturing apparatus according to the first aspect, it is possible to perform exposure control suitable to the photographic subject.

An image capturing apparatus according to a second aspect is the image capturing apparatus according to the first aspect in which the control unit is configured to further perform control to record an image signal representing the image obtained by controlling the exposure to a recording unit with a predetermined resolution, and the segment regions is said to have a size that corresponds to at least one of the number of pixels of the image displayed on the display unit or the number of pixels of the image recorded to the recording unit.

An image capturing apparatus according to a third aspect is the image capturing apparatus according to the second aspect in which the number of the segment regions may be a number equal to or smaller than at least one of the number of pixels of the image displayed on the display unit or the number of pixels of the image recorded to the recording unit.

An image capturing apparatus according to a fourth aspect is the image capturing apparatus according to any one of the first to third aspects in which the size of the segment regions may be a size determined in accordance with a resolution that is used in a case where the control unit controls the exposure.

An image capturing apparatus according to a fifth aspect is the image capturing apparatus according to any one of the first to fourth aspects in which the division regions may be regions obtained by division based on a brightness of the image.

An image capturing apparatus according to a sixth aspect is the image capturing apparatus according to any one of the first to fifth aspects in which the segment regions may have a predetermined shape.

An image capturing apparatus according to a seventh aspect is the image capturing apparatus according to any one of the first to sixth aspects in which the information about the at least one division region may be information indicating a characteristic value of brightness.

An image capturing apparatus according to an eighth aspect is the image capturing apparatus according to any one of the first to sixth aspects in which the information about the at least one division region may be information indicating a degree of exposure.

An image capturing apparatus according to a ninth aspect is the image capturing apparatus according to any one of the first to sixth aspects in which the information about the at least one division region may be information indicating a number of pixels.

A control method for an image capturing apparatus according to a tenth aspect includes a process including:

controlling an exposure for each of three or more division regions obtained by dividing an image represented by an image signal obtained by image capturing of a photographic subject by an imaging device through an image capturing optical system; further dividing the image into a plurality of segment regions different from the division regions and, in a case where a segment region among the segment regions extends across a boundary between some of the division regions, controlling an exposure in accordance with information about at least one division region among the some of the division regions over which the segment region extends; and displaying the image for which the exposure is controlled on a display unit.

With the control method for the image capturing apparatus according to the tenth aspect, it is possible to perform exposure control suitable to the photographic subject.

A control program for an image capturing apparatus according to an eleventh aspect causes a computer to perform a process including: controlling an exposure for each of three or more division regions obtained by dividing an image represented by an image signal obtained by image capturing of a photographic subject by an imaging device through an image capturing optical system; further dividing the image into a plurality of segment regions different from the division regions and, in a case where a segment region among the segment regions extends across a boundary between some of the division regions, controlling an exposure in accordance with information about at least one division region among the some of the division regions over which the segment region extends; and displaying the image for which the exposure is controlled on a display unit.

With the control program for the image capturing apparatus according to the eleventh aspect, it is possible to perform exposure control suitable to the photographic subject.

According to the present disclosure, it is possible to perform exposure control suitable to the photographic subject.

DESCRIPTION OF THE PREFERRED EMBODIMENTS

Hereinafter, example embodiments of the technique of the present disclosure will be described in detail with reference to the drawings.

First Embodiment

Figure 1:
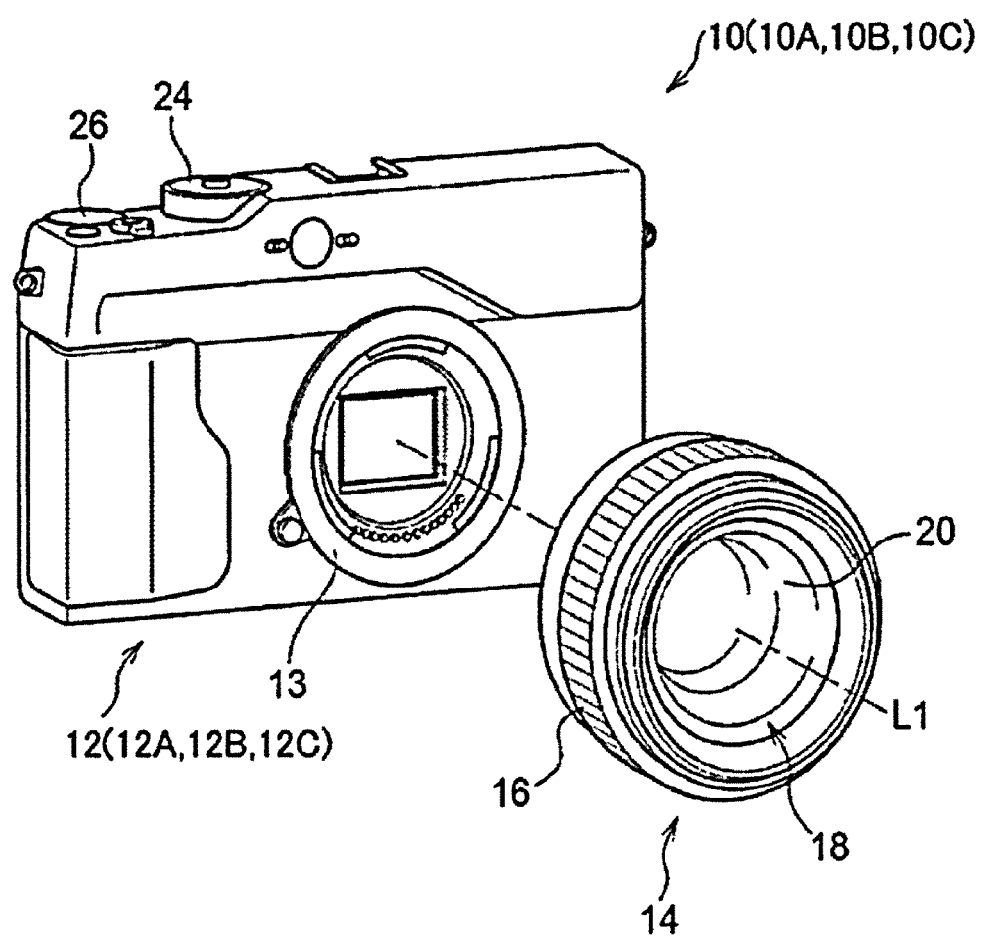
FIG. 1 is a perspective view illustrating an example external appearance of an image capturing apparatus according to first to fourth embodiments.

First, an example configuration of an image capturing apparatus 10 of this embodiment will be described with reference to FIG. 1 to FIG. 3. As illustrated in FIG. 1, for example, the image capturing apparatus 10 of this embodiment is an interchangeable-lens digital camera and includes an image capturing apparatus main body 12 and an image capturing lens 14.

The image capturing lens 14 is attached to the image capturing apparatus main body 12 so as to be interchangeable. On the lens barrel of the image capturing lens 14, a focus ring 16 that is used in a manual focus mode is provided. The image capturing lens 14 includes a lens unit 18. The lens unit 18 of this embodiment is an example of an image capturing optical system of the present disclosure.

The lens unit 18 is a combination lens in which a plurality of lenses including a focus lens 20 are combined. The focus lens 20 moves in the direction of an optical axis L1 of the image capturing optical system in accordance with a manual rotation operation of the focus ring 16, and photographic subject light, which is reflected light representing a photographic subject, forms an image on a photosensitive surface 22A of an imaging device 22 (see FIG. 3) described below at an in-focus position corresponding to the distance to the photographic subject.

On the top surface of the image capturing apparatus main body 12, a dial 24 and a release button 26 are provided. The dial 24 is operated for various settings, such as switching between an image capture mode and a playback mode. Accordingly, in the image capturing apparatus 10, in a case where the dial 24 is operated by the user, the image capture mode or the playback mode is selectively set as an operation mode.

As the operation mode for image capturing, the image capturing apparatus 10 has a still-image capture mode and a moving-image capture mode. The still-image capture mode is an operation mode for recording a still image obtained by image capturing of a photographic subject by the image capturing apparatus 10. The moving-image capture mode is an operation mode for recording a moving image obtained by image capturing of a photographic subject by the image capturing apparatus 10.

The release button 26 is configured to be capable of detecting a depressing operation in two stages, that is, an image capture preparation instruction state and an image capture instruction state. The image capture preparation instruction state refers to a state where, for example, the release button 26 is depressed from a standby position to an intermediate position (a half-push position), and the image capture instruction state refers to a state where the release button 26 is depressed to a final depress position (full-push position) beyond the intermediate position. Hereinafter, the "state where the release button 26 is depressed from the standby position to the half-push position" is called "half-push state", and the "state where the release button 26 is depressed from the standby position to the full-push position" and the "state where the release button 26 is depressed from the half-push position to the full-push position" are called "full-push state".

In an autofocus mode, when the release button 26 is set to the half-push state, image capture conditions are adjusted, and thereafter, in a case where the release button 26 is subsequently set to the full-push state, actual exposure is performed. That is, in a case where the release button 26 is set to the half-push state, an AE (auto-exposure) function is activated and the exposure state is set, and thereafter, an AF (autofocus) function is activated and in-focus control is performed. In a case where the release button 26 is set to the full-push state, image capturing is performed.

Figure 2:
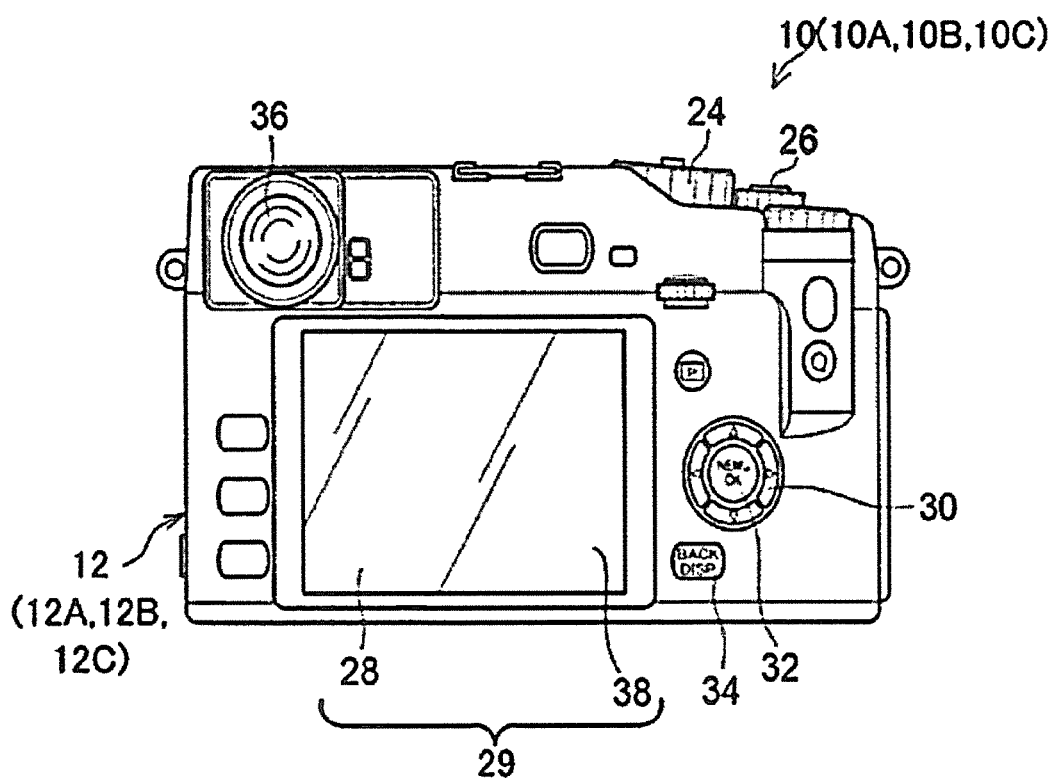
FIG. 2 is a rear view illustrating an example external appearance of the rear surface side of the image capturing apparatus according to the first to fourth embodiments.

As illustrated in FIG. 2, for example, on the rear surface of the image capturing apparatus main body 12, a display 28, a cross key 30, a MENU/OK key 32, a BACK/DISP button 34, a viewfinder 36, and a touch panel 38 are provided.

The display 28 is, for example, an LCD (liquid crystal display) and displays an image obtained by image capturing of a photographic subject by the image capturing apparatus 10, text, and so on. The display 28 of this embodiment is an example of a display unit of the present disclosure. The display 28 of this embodiment and the touch panel 38 constitute a touch panel display 29. The display 28 is used to display a live preview image in the image capture mode. The live preview image is also called a through-image and is a series of frame images obtained by the imaging device 22 of the image capturing apparatus 10 performing image capturing of a photographic subject as a series of frames. In a case where an instruction for still-image capturing is given, the display 28 is used to also display a still image obtained by single-frame image capturing. Further, the display 28 is used to also display a playback image in the playback mode, a menu screen, and so on.

On the surface of a display region of the display 28, the touch panel 38 of a transparent type is overlaid. The touch panel 38 senses, for example, a touch of an instructing object, such as a finger or a stylus pen. The touch panel 38 outputs, to a predetermined output destination (for example, a CPU (central processing unit) 74 described below, see FIG. 3), sensing result information indicating the sensing result, such as the presence or absence of a touch of an instructing object on the touch panel 38, at predetermined intervals of, for example, 100 milliseconds. In a case where the touch panel 38 senses a touch of an instructing object, the sensing result information includes two-dimensional coordinates (hereinafter referred to as "coordinates") with which the position at which the instructing object touches the touch panel 38 can be identified. In a case where the touch panel 38 does not sense a touch of an instructing object, the sensing result information does not include the coordinates.

The cross key 30 functions as a multifunction key for selecting one or more menus and for outputting instruction detail signals corresponding to various instructions including zooming, frame-by-frame playback, and so on. The MENU/OK key 32 is an operation key having both the function of a menu (MENU) button for giving an instruction for displaying one or more menus on the screen of the display 28 and the function of an accepting (OK) button for, for example, confirming a selection and giving an instruction for execution. The BACK/DISP button 34 is used in a case of, for example, erasing a desired target, such as a selected item, cancelling a specification, or returning to the previous operation state.

Figure 3:
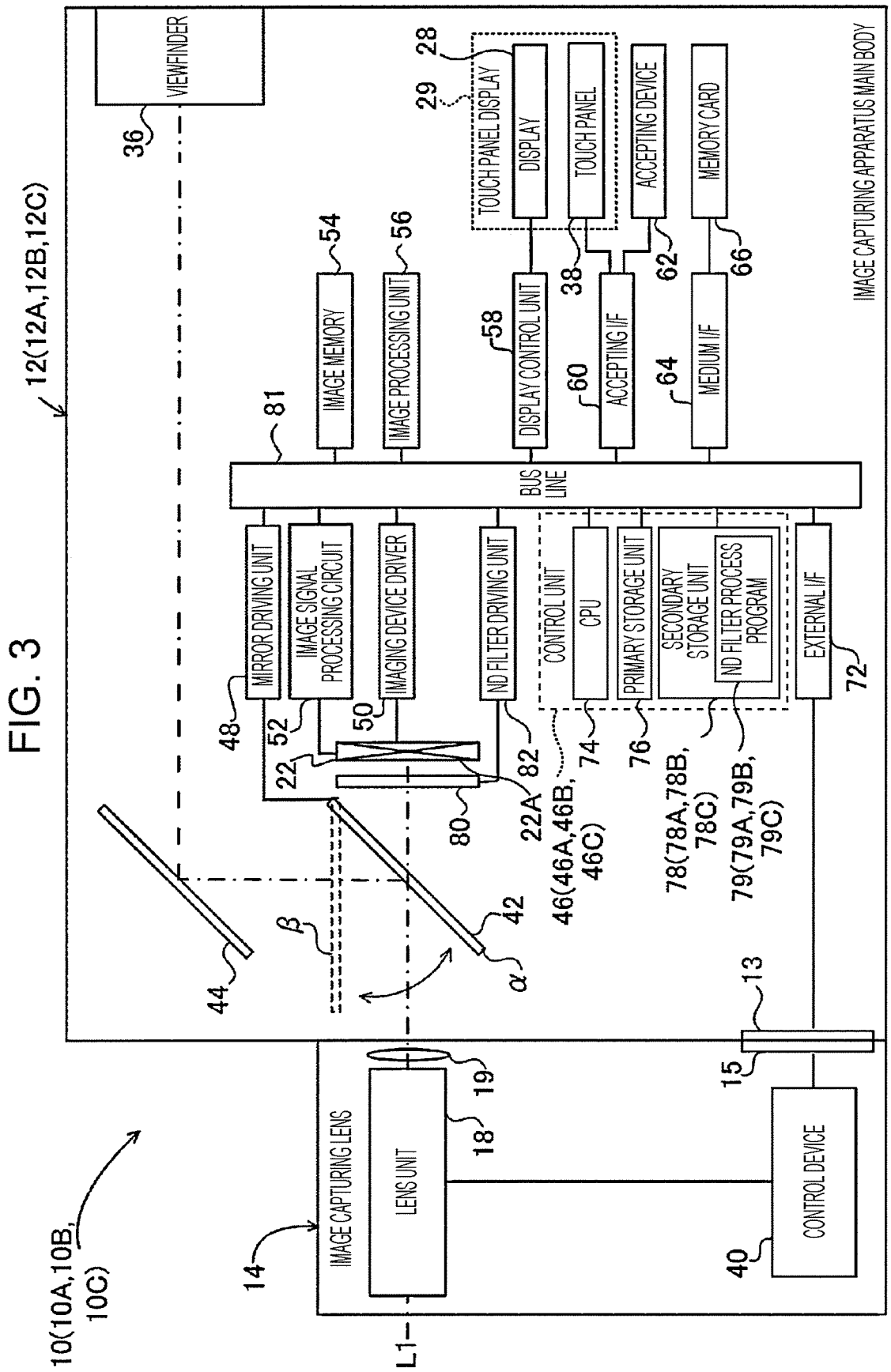
FIG. 3 is a block diagram illustrating an example hardware configuration of the image capturing apparatus according to the first to fourth embodiments.

FIG. 3 is a block diagram illustrating an example hardware configuration of the image capturing apparatus 10 according to the first embodiment.

As illustrated in FIG. 3, the image capturing apparatus main body 12 of this embodiment includes a mount 13 (see also FIG. 1), and the image capturing lens 14 includes a mount 15. In a case where the mount 15 is coupled with the mount 13, the image capturing lens 14 is attached to the image capturing apparatus main body 12 so as to be interchangeable.

The image capturing lens 14 includes the lens unit 18 described above, an aperture diaphragm 19, and a control device 40. In a case where the mount 15 is connected with the mount 13, the control device 40 is electrically connected to the CPU 74 through an external I/F (interface) 72 of the image capturing apparatus main body 12 to control the image capturing lens 14 as a whole in accordance with instructions from the CPU 74.

The aperture diaphragm 19 is provided on the image capturing apparatus main body 12 side relative to the lens unit 18. To the aperture diaphragm 19, a diaphragm driving unit and a diaphragm driving motor not illustrated are connected. The diaphragm driving unit is controlled by the control device 40 to operate the diaphragm driving motor in accordance with an instruction accepted by an accepting device 62 described below to adjust the size of the aperture of the aperture diaphragm 19, thereby adjusting the amount of photographic subject light that has passed though the lens unit 18 and guiding the photographic subject light into the image capturing apparatus main body 12.

As illustrated in FIG. 3, the image capturing apparatus main body 12 of this embodiment includes the imaging device 22, a first mirror 42, a second mirror 44, a control unit 46, a mirror driving unit 48, an imaging device driver 50, an image signal processing circuit 52, an image memory 54, an image processing unit 56, a display control unit 58, an ND filter 80, and an ND filter driving unit 82. The image capturing apparatus main body 12 further includes an accepting I/F 60, the accepting device 62, a medium I/F 64, and the external I/F 72.

The control unit 46 is an example of a computer in the technique of the present disclosure and includes the CPU 74, a primary storage unit 76, and a secondary storage unit 78. The CPU 74 controls the image capturing apparatus 10 as a whole. The primary storage unit 76 is a volatile memory that is used as a work area and so on in a case where various programs are executed. Examples of the primary storage unit 76 include a RAM (random access memory). The secondary storage unit 78 of this embodiment is a nonvolatile memory that stores in advance various programs including an ND filter process program 79 described in detail below, various parameters, and so on. Examples of the secondary storage unit 78 include an EEPROM (electrically erasable programmable read-only memory) and a flash memory.

The CPU 74, the primary storage unit 76, and the secondary storage unit 78 are connected to a bus line 81. The mirror driving unit 48, the imaging device driver 50, the image signal processing circuit 52, and the ND filter driving unit 82 are also connected to the bus line 81. The image memory 54, the image processing unit 56, the display control unit 58, the accepting I/F 60, the medium I/F 64, and the external I/F 72 are also connected to the bus line 81.

The first mirror 42 is interposed between the photosensitive surface 22A of the imaging device 22 and the lens unit 18 and is a movable mirror that can be moved to a photosensitive surface cover position α and to a photosensitive surface open position β.

The first mirror 42 is connected to the mirror driving unit 48, and the mirror driving unit 48 is controlled by the CPU 74 to drive the first mirror 42 and place the first mirror 42 in the photosensitive surface cover position α or the photosensitive surface open position β in a selective manner. That is, in a case of not allowing the photosensitive surface 22A to receive photographic subject light, the first mirror 42 is placed in the photosensitive surface cover position α by the mirror driving unit 48, and in a case of allowing the photosensitive surface 22A to receive photographic subject light, the first mirror 42 is placed in the photosensitive surface open position β by the mirror driving unit 48.

In the photosensitive surface cover position α, the first mirror 42 covers the photosensitive surface 22A, and reflects and guides photographic subject light incoming from the lens unit 18 to the second mirror 44. The second mirror 44 reflects the photographic subject light guided by the first mirror 42 to thereby guide the photographic subject light to the viewfinder 36 through an optical system (not illustrated). The viewfinder 36 transmits the photographic subject light guided by the second mirror 44.

In the photosensitive surface open position β, the photosensitive surface 22A covered by the first mirror 42 is uncovered, and photographic subject light is received by the photosensitive surface 22A without reflected by the first mirror 42.

The ND filter 80 of this embodiment is an ND filter having a plurality of graduated light transmittances. The light transmittances of the ND filter 80 are not limited to those of this embodiment and, for example, the ND filter 80 may have a plurality of continuous light transmittances. The ND filter 80 of this embodiment is placed between the first mirror 42 in the photosensitive surface cover position α and the imaging device 22 on the optical axis L1. The ND filter 80 is connected to the ND filter driving unit 82. The CPU 74 changes a voltage to be applied to the ND filter 80 from the ND filter driving unit 82 to thereby control the light transmittance of the ND filter 80 in accordance with a predetermined resolution. The CPU 74 thus controls the light transmittance of the ND filter 80 to thereby control the exposure of a photographic subject image formed on the imaging device 22 from the lens unit 18 through the aperture diaphragm 19. The method for controlling the light transmittance is not limited to a control method in which a physical filter having a light transmittance that is variable for each region is used but may be a control method in which the amount of exposure or the amount of received light is controlled for each of the pixels in a corresponding region of the imaging device 22 in an individual manner.

The image capturing apparatus 10 of this embodiment employs a form in which the CPU 74 performs an ND filter process described in detail below in a case where an instruction is given by the user using the cross key 30 or the like from menus displayed on the display 28; however, the method for the user to give an instruction for performing the ND filter process is not specifically limited. For example, a form may be employed in which a dedicated button or the like for the user to give an instruction for the ND filter process is provided on the image capturing apparatus main body 12 and the dedicated button is used to give an instruction for performing the ND filter process.

The imaging device driver 50 is connected to the imaging device 22 and is controlled by the CPU 74 to supply a driving pulse to the imaging device 22. Each pixel of the imaging device 22 is driven in accordance with the driving pulse supplied by the imaging device driver 50. In this embodiment, a CCD (charge-coupled device) image sensor is used as the imaging device 22; however, the technique of the present disclosure is not limited to this. For example, another image sensor, such as a CMOS (complementary metal-oxide semiconductor) image sensor, may be used.

The image signal processing circuit 52 is controlled by the CPU 74 to read an image signal for one frame from each pixel of the imaging device 22. The image signal processing circuit 52 performs various types of processing including correlative double sampling processing, automatic gain control, and A/D (analog/digital) conversion for the read image signals. The image signal processing circuit 52 outputs digitized image signals obtained as a result of various type of processing performed for the image signals to the image memory 54 on a per frame basis at a specific frame rate (for example, several tens of frames/sec.) defined by a clock signal supplied from the CPU 74.

The imaging device 22 and the imaging device driver 50 of this embodiment correspond to an example of an image capturing unit of the present disclosure.

The image memory 54 temporarily retains image signals input from the image signal processing circuit 52.

The image processing unit 56 obtains image signals from the image memory 54 at a specific frame rate on a per frame basis and performs various types of processing including gamma correction, brightness conversion, color difference conversion, and compression on the obtained image signals. The image processing unit 56 outputs image signals obtained as a result of various types of processing to the display control unit 58 at a specific frame rate on a per frame basis. Further, the image processing unit 56 outputs the image signals obtained as a result of various types of processing to the CPU 74 in response to a request from the CPU 74.

The display control unit 58 is connected to the display 28 of the touch panel display 29 and is controlled by the CPU 74 to control the display 28. The display control unit 58 outputs image signals input from the image processing unit 56 to the display 28 at a specific frame rate on a per frame basis.

The display 28 displays an image represented by image signals input from the display control unit 58 at a specific frame rate as a live preview image. The display 28 also displays a still image, which is a single-frame image obtained by single-frame image capturing. On the display 28, a playback image, a menu screen, and so on are displayed in addition to a live preview image.

The accepting device 62 has the dial 24, the release button 26, the cross key 30, the MENU/OK key 32, the BACK/DISP button 34, and so on and accepts various instructions from the user.

The touch panel 38 of the touch panel display 29 and the accepting device 62 are connected to the accepting I/F 60 and output an instruction detail signal indicating the details of an accepted instruction to the accepting I/F 60. The accepting I/F 60 outputs the input instruction detail signal to the CPU 74. The CPU 74 performs a process in accordance with the instruction detail signal input from the accepting I/F 60.

To the medium I/F 64, a memory card 66 is connected so as to be detachable and re-attachable. The medium I/F 64 is controlled by the CPU 74 to record and read an image file to and from the memory card 66. The medium I/F 64 and the memory card 66 of this embodiment correspond to an example of a recording unit of the present disclosure.

An image file read from the memory card 66 by the medium I/F 64 is subjected to decompression by the image processing unit 56 controlled by the CPU 74 and is displayed on the display 28 as a playback image.

In the image capturing apparatus 10, the operation mode is switched in accordance with an instruction accepted by the accepting device 62. In the image capturing apparatus 10, for example, in the image capture mode, the still-image capture mode and the moving-image capture mode are selectively set in accordance with an instruction accepted by the accepting device 62. In the still-image capture mode, a still-image file can be recorded to the memory card 66. In the moving-image capture mode, a moving-image file can be recorded to the memory card 66.

In a case where an instruction for capturing a still image given by using the release button 26 is accepted in the still-image capture mode, the CPU 74 controls the imaging device driver 50 to allow the imaging device 22 to be actually exposed for one frame. The image processing unit 56 is controlled by the CPU 74 to obtain image signals obtained as a result of the exposure for one frame, perform compression on the obtained image signals, and generate a still-image file in a specific still-image format. The specific still-image format is, for example, the JPEG (Joint Photographic Experts Group) format. The still-image file is recorded to the memory card 66 through the medium I/F 64 by the image processing unit 56 controlled by the CPU 74.

In a case where an instruction for capturing a moving image given by using the release button 26 is accepted in the moving-image capture mode, the image processing unit 56 performs compression on image signals for a live preview image and generates a moving-image file in a specific moving-image format. The specific moving-image format is, for example, the MPEG (Moving Picture Experts Group) format. The moving-image file is recorded to the memory card 66 through the medium I/F 64 by the image processing unit 56 controlled by the CPU 74.

Next, as an operation of the image capturing apparatus 10 of this embodiment, an operation of the image capturing apparatus 10 to be performed in a case of performing the ND filter process of this embodiment will be described.

In the image capturing apparatus 10 of this embodiment, in the image capture mode, a live preview image is displayed on the touch panel display 29 as described above. In the image capturing apparatus 10 of this embodiment, for the live preview image displayed on the touch panel display 29, the ND filter process for controlling the exposure for each region (hereinafter referred to as "division region") obtained as a result of division along a boundary line specified by the user is performed.

Figure 4:
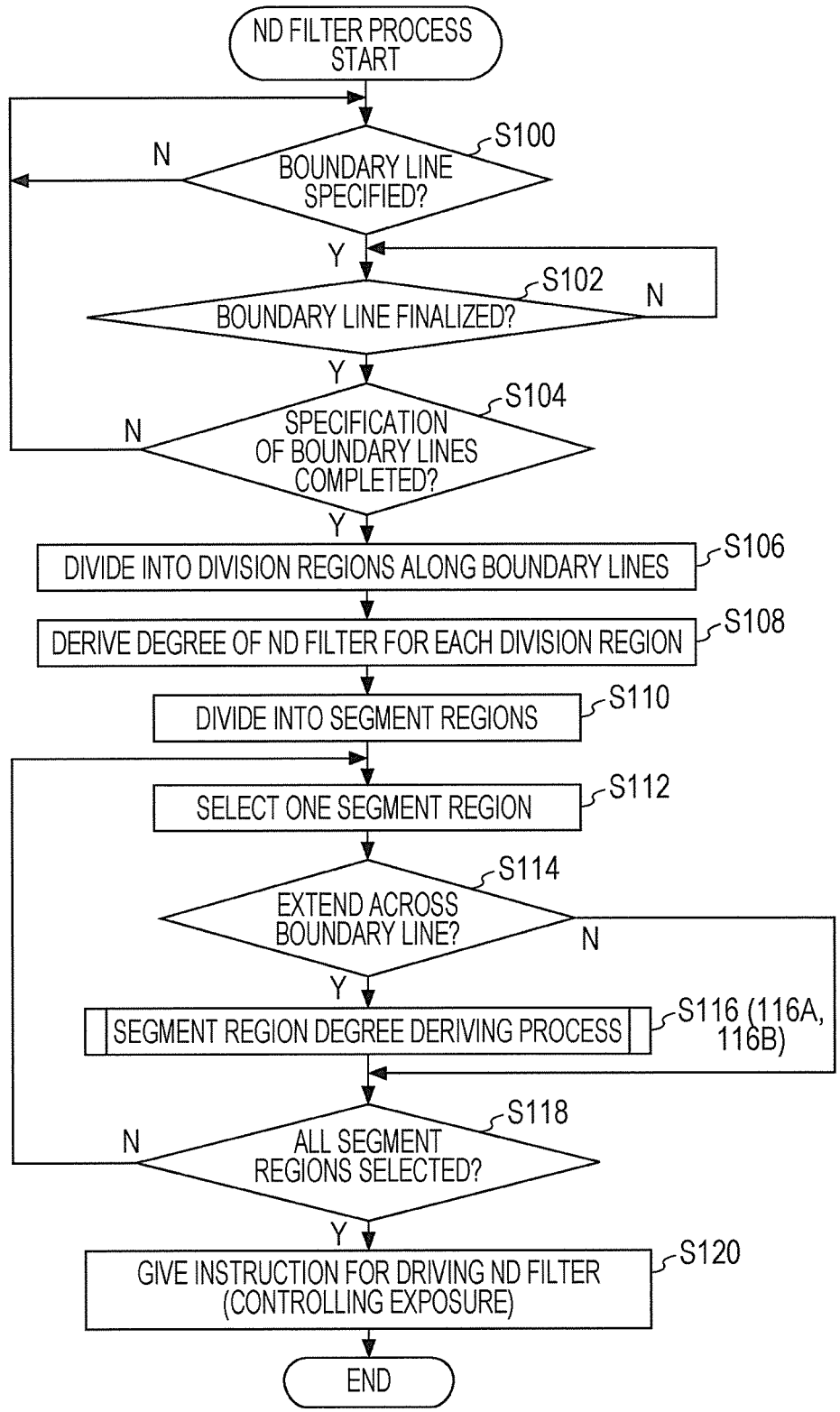
FIG. 4 is a flowchart illustrating an example flow of an ND filter process according to the first to third embodiments.

Specifically, in the image capture mode, in a case where an instruction for performing the ND filter process is given by the user, the CPU 74 of the image capturing apparatus 10 of this embodiment reads from the secondary storage unit 78, loads to the primary storage unit 76, and executes the ND filter process program 79 to thereby perform the ND filter process, an example of which is illustrated in FIG. 4. The CPU 74 executes the ND filter process program 79 to thereby function as a control unit of the present disclosure.

Figure 5:
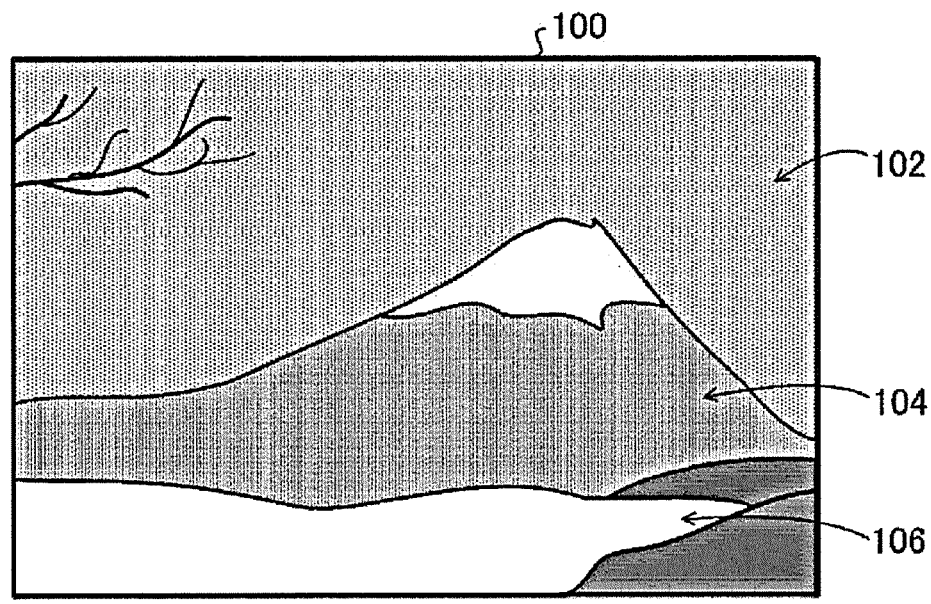
FIG. 5 is a diagram illustrating an example live preview image.

For convenience of description, a description is given below of a case where the ND filter process is performed for a live preview image 100, an example of which is illustrated in FIG. 5, displayed on the touch panel display 29. The live preview image 100 illustrated in FIG. 5 is the live preview image 100 obtained by capturing an image of "sky", "mountain", and "cloud", which are example photographic subjects, and includes an image 102 that mainly includes an image of the sky, an image 104 that mainly includes an image of a mountain, and an image 106 that mainly includes an image of a cloud. In the image capturing apparatus 10 of this embodiment, the exposure is controlled for each of the image 102, the image 104, and the image 106.

In step S100 in FIG. 4, the CPU 74 determines whether the user specifies a boundary line. In the image capturing apparatus 10 of this embodiment, as described above, a boundary line for dividing the live preview image 100 to obtain division regions is specified by the user. The method for specifying a boundary line by the user is not specifically limited; however, in this embodiment, for example, the user traces the boundary line between division regions in the live preview image 100 displayed on the touch panel display 29 with an instructing object to thereby specify the boundary line.

The result of determination in step S100 remains negative until a boundary line is specified by the user, which corresponds to a standby state. On the other hand, in a case where a boundary line is specified by the user, the result of determination in step S100 is positive, and the flow proceeds to step S102. In a case where a boundary line is specified by the user, sensing result information including the coordinates of the boundary line is output to the CPU 74 from the touch panel 38 of the touch panel display 29.

In step S102, the CPU 74 determines whether the boundary line is finalized. In the image capturing apparatus 10 of this embodiment, for example, the CPU 74 determines that the boundary line is finalized in a case where, for example, sensing result information input from the touch panel 38 does not include the coordinates of the boundary line any more.

That is, while the user is tracing the live preview image 100 (on the touch panel display 29), specification of a boundary line is ongoing, and sensing result information includes the coordinates of the boundary line. Accordingly, the result of determination in step S102 is negative, which corresponds to the standby state. On the other hand, in a case where the user stops tracing the live preview image 100 (on the touch panel display 29), sensing result information does not include the coordinates of the boundary line any more. Accordingly, the result of determination in step S102 is positive, and the flow proceeds to step S104.

Figure 6:
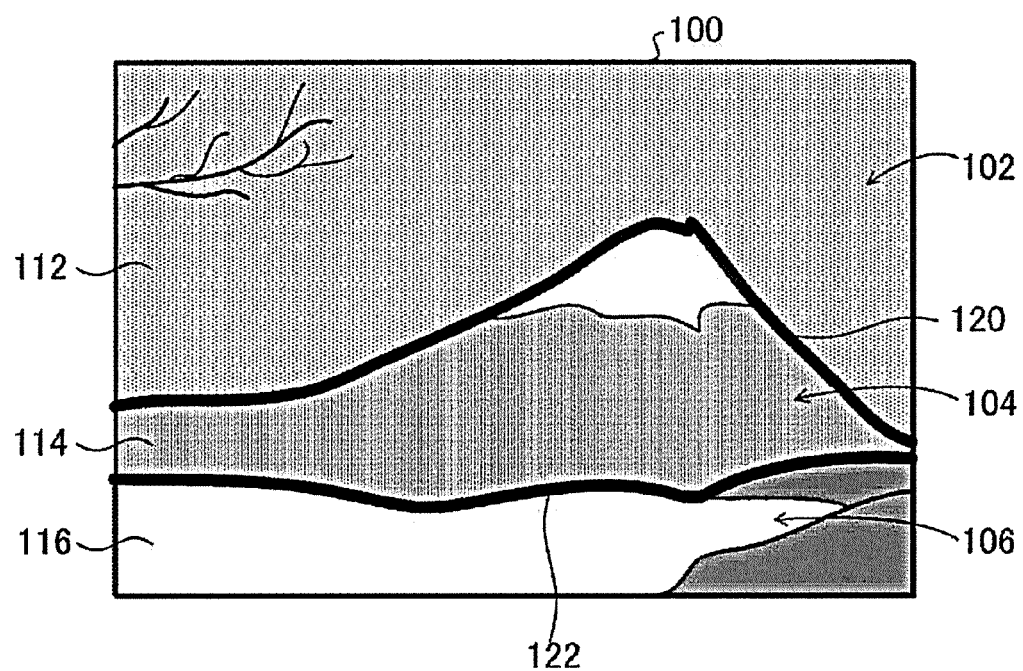
FIG. 6 is a diagram for explaining example boundary lines (division regions) specified for the live preview image illustrated in FIG. 5.

In step S104, the CPU 74 determines whether specification of boundary lines is completed. In a case where the number of division regions is three or more, the user specifies a plurality of boundary lines. For example, in a case where the user wants to adjust the exposure as described above for the live preview image 100 illustrated in FIG. 5, the user specifies, for example, a boundary line 120 and a boundary line 122 as illustrated in FIG. 6. Accordingly, depending on the captured image, a plurality of boundary lines may be specified. Therefore, the CPU 74 determines whether specification of all boundary lines is completed in step S104. The method for determining whether specification of all boundary lines is completed is not specifically limited; however, the CPU 74 of this embodiment determines that specification of all boundary lines is completed in a case where the accepting device 62 accepts an instruction for completing specification of boundary lines from the user.

In a case where specification of all boundary lines is not completed, that is, for example, in a case where specification of only one of the boundary line 120 or the boundary line 122 is finalized in the case illustrated in FIG. 6, the result of determination in step S104 is negative, the flow returns to step S100, and specification of the other boundary line is performed by the user. On the other hand, in a case where specification of all boundary lines is completed, the result of determination in step S104 is positive, and the flow proceeds to step S106.

In step S106, the CPU 74 divides the live preview image 100 into a plurality of division regions along the boundary lines specified by the user. In the example illustrated in FIG. 6, the live preview image 100 is divided into three division regions, namely, a division region 112 including the image 102, a division region 114 including the image 104, and a division region 116 including the image 106, along the two boundary lines, namely, the boundary line 120 and the boundary line 122.

In the next step S108, the CPU 74 derives the degree of the ND filter 80 for each division region. In other words, in step S108, the CPU 74 derives the filter factor of the ND filter 80. The degree of the ND filter 80 is an example of the degree to which the exposure is controlled. In this embodiment, as the degree of the ND filter 80 increases, the ND filter process is more effective, and the light transmittance of the ND filter 80 decreases. Accordingly, the degree to which the exposure is controlled increases. In this case, a blown-out-highlights prevention effect is enhanced. In this embodiment, as the degree of the ND filter 80 decreases, the ND filter process is less effective, and the light transmittance of the ND filter 80 increases. Accordingly, the degree to which the exposure is controlled decreases. In this case, a blocked-up-shadows prevention effect is enhanced.

The method for deriving the degree of the ND filter 80 by the CPU 74 is not specifically limited. For example, the CPU 74 may derive the degree of the ND filter 80 on the basis of the brightness of each division region of the captured image. In this case, for example, information indicating a correspondence between the brightness and the degree of the ND filter 80 may be stored in advance in the secondary storage unit 78, the average of brightness may be calculated for each division region, and the degree of the ND filter 80 corresponding to the calculated average may be derived from the information indicating the correspondence and stored in the secondary storage unit 78. Alternatively, for example, the CPU 74 may accept the degree of the ND filter 80 for each division region from the user through the accepting device 62 to derive the degree of the ND filter 80 for each division region.

Figure 7:
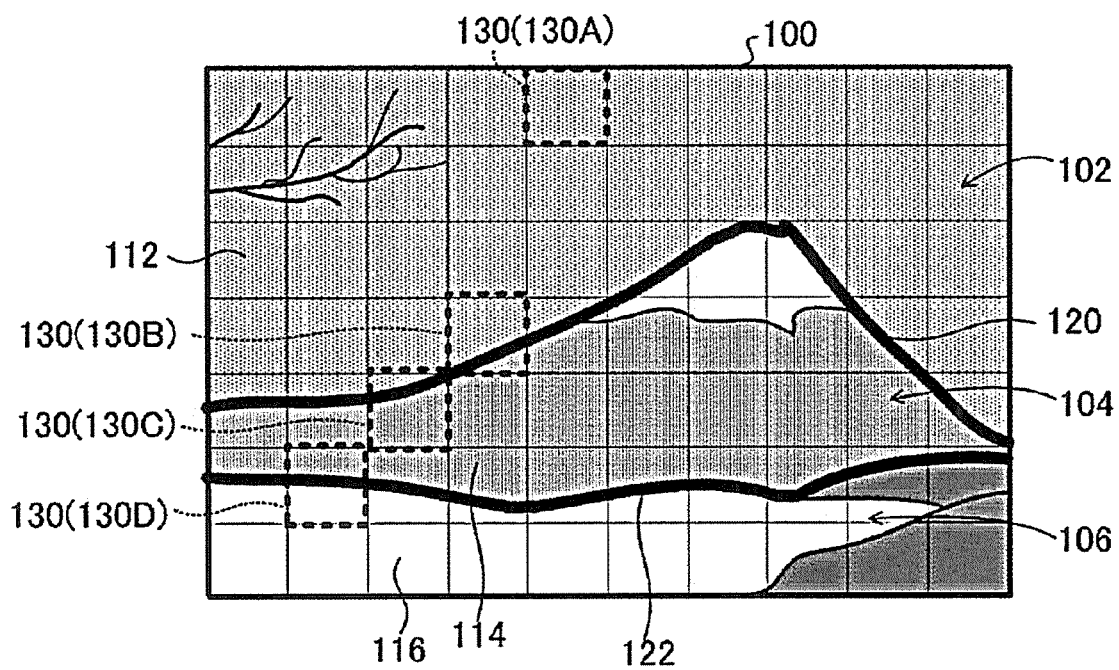
FIG. 7 is a diagram for explaining example segment regions obtained by dividing the live preview image illustrated in FIG. 5.

In the next step S110, the CPU 74 divides the live preview image 100 into a plurality of segment regions on the basis of a size determined in advance in accordance with the resolution with which control of the light transmittance of the ND filter 80 is possible, that is, the resolution with which control of the exposure by the ND filter 80 is possible. FIG. 7 illustrates an example of the live preview image 100 divided into segment regions. The example illustrated in FIG. 7 represents a state where the live preview image 100 is divided into 70 segment regions 130. Each segment region 130 is the minimum unit for which the CPU 74 controls the exposure. The shape of the segment regions 130 is determined in advance in accordance with the ND filter 80, a unit for which the CPU 74 controls the exposure, and so on. In this embodiment, the shape of the segment regions 130 is, for example, a rectangular shape, as illustrated in FIG. 7.

In this embodiment, the CPU 74 associates each segment region 130 with information indicating any division region included in the segment region 130. For example, in the example illustrated in FIG. 7, the CPU 74 associates a segment region 130A with information indicating the division region 112 and associates a segment region 130B with information indicating the division region 112 and information indicating the division region 114.

In the next step S112, the CPU 74 selects one of the segment regions. In the next step S114, the CPU 74 determines whether the selected segment region extends across a boundary line. The method for determining whether the segment region extends across a boundary line by the CPU 74 is not specifically limited. For example, in a case where a plurality of pieces of information indicating division regions are associated with the selected segment region, the CPU 74 may determine that the segment region extends across a boundary line. Alternatively, for example, unlike in this embodiment, in a case where, for example, information indicating the division region 112 is not associated with the segment regions 130, the CPU 74 may determine, on the basis of the coordinates of the selected segment region 130 and the coordinates of the boundary lines of the division regions obtained in the process in step S106, whether the segment region 130 extends across a boundary line in accordance with whether the coordinates of the boundary line are included in the coordinates of the segment region 130.

In a case where the selected segment region does not extend across a boundary line, that is, for example, in the example illustrated in FIG. 7, in a case where the selected segment region 130 is the segment region 130A, the result of determination in step S114 is negative, and the flow proceeds to step S118. In this case, the degree of the ND filter 80 for the selected segment region 130A is the degree of the ND filter 80 corresponding to the division region 112 associated with the segment region 130A.

On the other hand, in a case where the selected segment region extends across a boundary line, the result of determination in step S114 is positive, and the flow proceeds to step S116. For example, in the example illustrated in FIG. 7, the segment region 130B and a segment region 130C each extend across the boundary line 120, and a segment region 130D extends across the boundary line 122. Therefore, in a case where any of these segment regions 130 is selected, the result of determination in step S114 is positive.

Figure 8:
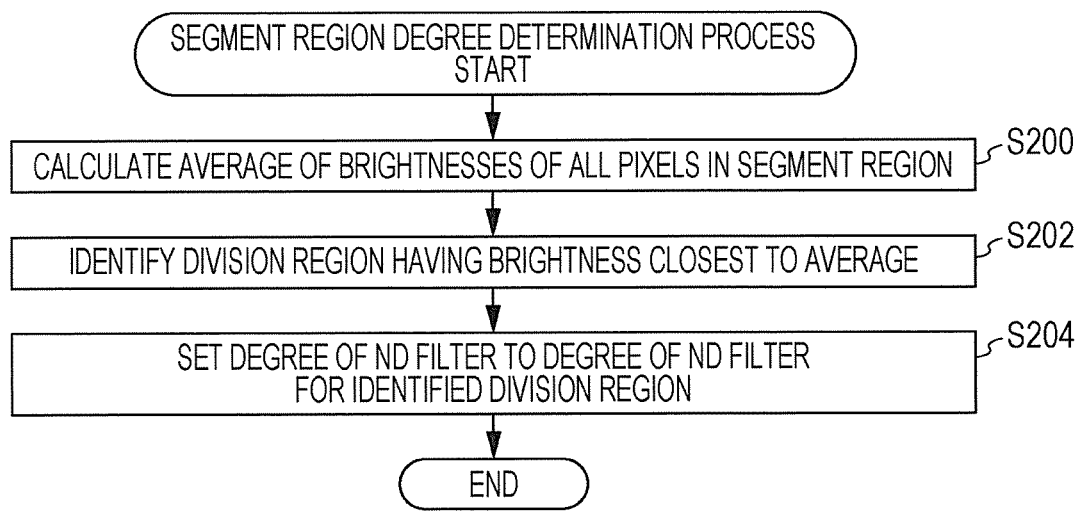
FIG. 8 is a flowchart illustrating an example flow of a segment region degree determination process according to the first embodiment.

In step S116, the CPU 74 performs a segment region degree determination process, an example of which is illustrated in FIG. 8, to derive the degree of the ND filter 80 for the segment region 130. In this embodiment, in the segment region degree determination process, as information about at least one division region among the division regions over which the selected segment region extends, information indicating characteristic values of the brightnesses of the division regions is used to control the exposure.

In step S200 in FIG. 8, the CPU 74 calculates the average of the brightness values (hereinafter simply referred to as "brightnesses") of all pixels in the selected segment region 130 (hereinafter simply referred to as "selected region"). In the next step S202, the CPU 74 identifies a division region in which the average of the brightness of the division region is closest to the average of the brightness of the selected region among the plurality of division regions associated with the selected region.

In a case where the difference in brightness between the plurality of division regions associated with the selected region is relatively small, the average tends to be closer to the brightness of a division region having a larger area in the selected region. For example, in a case where the difference between the brightness of the division region 112 and the brightness of the division region 114 is relatively small, the average of the brightness of the segment region 130B tends to be closer to the brightness of the division region 112. Therefore, in a case where the selected region is the segment region 130B, the CPU 74 identifies the division region 112 as a division region having a brightness closest to the average. For example, the average of the brightness of the segment region 130C tends to be closer to the brightness of the division region 114. Therefore, in a case where the selected region is the segment region 130C, the CPU 74 identifies the division region 114 as a division region having a brightness closest to the average.

In a case where the difference in brightness between the plurality of division regions associated with the segment region 130 is relatively large, the average tends to be closer to a brightness corresponding to a division region having the highest brightness among the division regions included in the segment region 130. For example, in a case where the brightness of the division region 116 is higher than the brightness of the division region 114 and the difference in brightness is relatively large, the average of the brightness of the segment region 130D tends to be closer to the brightness of the division region 116. Therefore, in a case where the selected region is the segment region 130D, the CPU 74 identifies the division region 116 as a division region having a brightness closest to the average.

The average of the brightness of the selected region is used in the segment region degree determination process of this embodiment; however, the average need not be used, and other characteristic values of the brightness may be used. For example, the mode, the median, or the like of the brightness of the selected region may be used. The average for the entire division region is used in the segment region degree determination process of this embodiment; however, the average for the entire division region need not be used and, for example, the average derived for a part of each division region included in the selected region may be used.

In the next step S204, the CPU 74 identifies the degree of the ND filter 80 for the identified division region as the degree of the ND filter 80 corresponding to the selected region, and thereafter, the segment region degree determination process ends, and the flow proceeds to step S118 in the ND filter process (see FIG. 4).

In step S118, the CPU 74 determines whether all of the segment regions 130 have been selected. In a case where the segment region 130 that has not been selected is present, the result of determination in step S118 is negative, the flow returns to step S112, and the above-described process is repeated. On the other hand, in a case where all of the segment regions 130 have been selected, the result of determination in step S118 is positive, and the flow proceeds to step S120.

In step S120, the CPU 74 gives, to the ND filter driving unit 82, an instruction for controlling the exposure by driving the ND filter 80 in accordance with the degree of the ND filter 80 derived for each segment region 130 in the above-described process, and thereafter, the ND filter process ends.

In a case where the ND filter process is thus performed, the live preview image 100 displayed on the touch panel display 29 is an image obtained while the degree of the ND filter 80 is controlled by the CPU 74. Thereafter, in a case where an instruction for image capturing is given by the user using the release button 26, an image obtained by image capturing by the imaging device 22 in a state where the exposure is controlled by the CPU 74 is recorded to the memory card 66.

As described above, the image capturing apparatus 10 of this embodiment includes the imaging device driver 50, the CPU 74, and the touch panel display 29. The imaging device driver 50 outputs image signals obtained by image capturing of a photographic subject by the imaging device 22 through the lens unit 18. In a case of controlling the exposure for each of the three or more division regions obtained by dividing an image represented by the image signals and in a case of dividing the image into the plurality of segment regions 130, which are different from the division regions and among which any of the segment regions 130 extends across a boundary line between some of the division regions, the CPU 74 controls the exposure of the segment region 130 in accordance with information about at least one division region among the some of the division regions over which the segment region 130 extends. The touch panel display 29 displays the live preview image 100, which is the image for which the exposure is controlled by the CPU 74.

With the image capturing apparatus 10 of this embodiment, the CPU 74 controls the exposure of the segment regions 130 as described above, and therefore, exposure control suitable to the photographic subject can be performed.

In the image capturing apparatus 10 of this embodiment, as the above-described information about a division region, the CPU 74 uses information indicating characteristic values of the brightnesses of the division regions in the segment region 130 to control the exposure. Therefore, the degree of the ND filter 80 for the selected region is set to the degree of the ND filter 80 based on the brightness in the selected region. Accordingly, with the image capturing apparatus 10 of this embodiment, the exposure can be controlled more appropriately in accordance with the brightness of the photographic subject.

In this embodiment, the form has been described in which, among the plurality of division regions associated with the selected region, a division region having a brightness closest to the average is identified, and the degree of the ND filter 80 for the selected region is set to the degree of the ND filter 80 for the identified division region; however, the form need not be employed. For example, a form may be employed in which a brightness derived on the basis of the ratio between the brightnesses of the plurality of division regions associated with the selected region is set as the brightness of the selected region, and the degree of the ND filter 80 is set in accordance with the brightness of the selected region.

Further, in this embodiment, as the segment region 130 that extends over division regions, the specific example case of one segment region 130 associated with two division regions has been described. Even in a case where three or more division regions are associated, in other words, two or more boundary lines are included in one segment region 130, the segment region degree determination process of this embodiment can be applied, as a matter of course.

Second Embodiment

In the first embodiment described above, the form has been described in which, in the segment region degree determination process in the ND filter process, as the information about at least one division region among the division regions over which the selected region extends, the information indicating characteristic values of the brightnesses of the division regions is used to control the exposure. In this embodiment, a form will be described in which, in the segment region degree determination process, as the information about at least one division region among the division regions over which the selected region extends, information indicating the numbers of pixels of the division regions is used to control the exposure. In this embodiment, components the same as those described in the first embodiment described above are assigned the same reference numerals, and descriptions thereof will be omitted.

For example, as illustrated in FIG. 1 to FIG. 3, an image capturing apparatus 10A of this embodiment is different from the image capturing apparatus 10 of the first embodiment described above in that the image capturing apparatus 10A has an image capturing apparatus main body 12A instead of the image capturing apparatus main body 12.

For example, as illustrated in FIG. 3, the image capturing apparatus main body 12A is different from the image capturing apparatus main body 12 in that the image capturing apparatus main body 12A has a control unit 46A instead of the control unit 46. The control unit 46A is different from the control unit 46 in that the control unit 46A has a secondary storage unit 78A instead of the secondary storage unit 78.

For example, as illustrated in FIG. 3, the secondary storage unit 78A is different from the secondary storage unit 78 in that the secondary storage unit 78A stores an ND filter process program 79A instead of the ND filter process program 79. The CPU 74 reads from the secondary storage unit 78A and loads to the primary storage unit 76 the ND filter process program 79A, and performs the ND filter process illustrated in FIG. 4 in accordance with the loaded ND filter process program 79A. The CPU 74 executes the ND filter process program 79A to thereby function as the control unit of the present disclosure.

Now, as an operation of the image capturing apparatus 10A of this embodiment, the ND filter process illustrated in FIG. 4 will be described. For an operation the same as that in the first embodiment described above, a description thereof will be omitted.

As illustrated in FIG. 4, an ND filter process of this embodiment is different from the ND filter process of the first embodiment described above in that step S116A is performed instead of step S116. Specifically, step S116A in the ND filter process of this embodiment is different in that a segment region degree determination process, an example of which is illustrated in FIG. 9, is performed instead of the segment region degree determination process (see FIG. 8) in step S116 in the ND filter process of the first embodiment described above.

Figure 9:
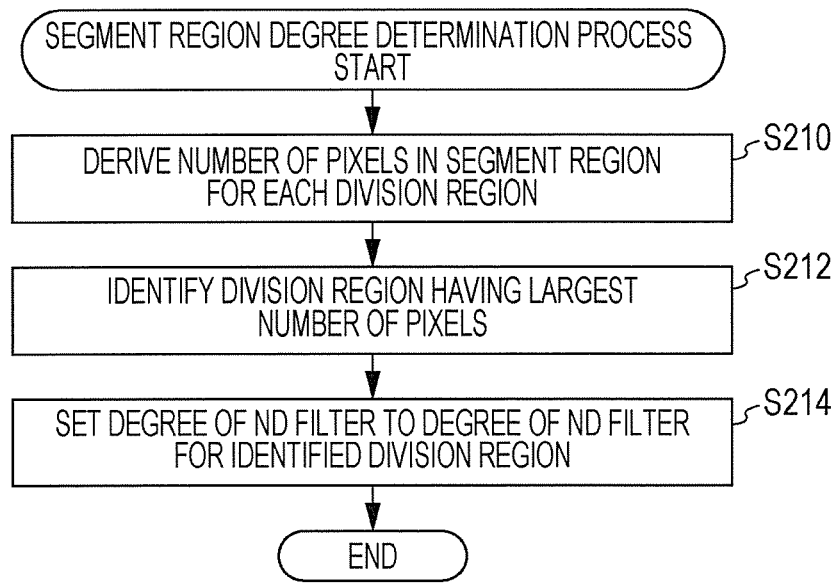
FIG. 9 is a flowchart illustrating an example flow of a segment region degree determination process according to the second embodiment.

In this embodiment, in step S210 in FIG. 9, the CPU 74 derives the number of pixels in the selected region for each of the division regions that are associated with the selected region. For example, in the example illustrated in FIG. 7, in the case where the selected region is the segment region 130B, the CPU 74 derives the number of pixels of the division region 112 in the segment region 130B and the number of pixels of the division region 114 in the segment region 130B. Deriving the number of pixels of each division region in the segment region 130 is equivalent to deriving the area of each division region in the segment region 130.

In the next step S212, the CPU 74 identifies, on the basis of the derived numbers of pixels, a division region having the largest number of pixels among the division regions associated with the selected region. For example, in the example illustrated in FIG. 7, in the case where the selected region is the segment region 130B, the CPU 74 identifies the division region 112 as a division region having the largest number of pixels. For example, in the example illustrated in FIG. 7, in the case where the selected region is the segment region 130C, the CPU 74 identifies the division region 114 as a division region having the largest number of pixels.

In the next step S214, the CPU 74 determines the degree of the ND filter 80 for the identified division region to be the degree of the ND filter 80 for the segment region as in step S204 (see FIG. 8) in the segment region degree determination process of the first embodiment, and thereafter, the segment region degree determination process of this embodiment ends, and the flow proceeds to step S118 (see FIG. 4) in the ND filter process. With the process in step S214, for example, the degree of the ND filter 80 for the segment region 130B becomes the same as the degree of the ND filter 80 for the division region 112 and, for example, the degree of the ND filter 80 for the segment region 130C becomes the same as the degree of the ND filter 80 for the division region 114.

As described above, in the image capturing apparatus 10A of this embodiment, in the segment region degree determination process, the CPU 74 determines the degree of the ND filter 80 for the selected region on the basis of the number of pixels of each division region in the selected region. Therefore, as in the image capturing apparatus 10 of the first embodiment, exposure control suitable to the photographic subject can be performed.

With the image capturing apparatus 10A of this embodiment, the processing speed of the segment region degree determination process can be increased and, for example, can be made higher than the processing speed of the segment region degree determination process (see FIG. 8) in the first embodiment.

In this embodiment, the form has been described in which, among the plurality of division regions associated with the selected region, a division region having the largest number of pixels is identified, and the degree of the ND filter 80 for the selected region is set to the degree of the ND filter 80 for the identified division region; however, the form need not be employed. For example, a form may be employed in which the degree of the ND filter 80 derived on the basis of the ratio between the numbers of pixels (areas) of the plurality of division regions associated with the selected region and on the basis of the degree of the ND filter 80 for each of the plurality of division regions is used.

Third Embodiment

In the first embodiment described above, the form has been described in which, in the segment region degree determination process in the ND filter process, as the information about at least one division region among the division regions over which the selected region extends, the information indicating characteristic values of the brightnesses of the division regions is used to control the exposure. In this embodiment, a form will be described in which, in the segment region degree determination process, as the information about at least one division region among the division regions over which the selected region extends, the degrees of the ND filter 80 for the division regions, which is an example of the degrees of exposure of the division regions, are used to control the exposure. In this embodiment, components the same as those described in the first embodiment described above are assigned the same reference numerals, and descriptions thereof will be omitted.

For example, as illustrated in FIG. 1 to FIG. 3, an image capturing apparatus 10B of this embodiment is different from the image capturing apparatus 10 of the first embodiment described above in that the image capturing apparatus 10B has an image capturing apparatus main body 12B instead of the image capturing apparatus main body 12.

For example, as illustrated in FIG. 3, the image capturing apparatus main body 12B is different from the image capturing apparatus main body 12 in that the image capturing apparatus main body 12B has a control unit 46B instead of the control unit 46. The control unit 46B is different from the control unit 46 in that the control unit 46B has a secondary storage unit 78B instead of the secondary storage unit 78.

For example, as illustrated in FIG. 3, the secondary storage unit 78B is different from the secondary storage unit 78 in that the secondary storage unit 78B stores an ND filter process program 79B instead of the ND filter process program 79. The CPU 74 reads from the secondary storage unit 78B and loads to the primary storage unit 76 the ND filter process program 79B, and performs the ND filter process illustrated in FIG. 4 in accordance with the loaded ND filter process program 79B. The CPU 74 executes the ND filter process program 79B to thereby function as the control unit of the present disclosure.

Now, as an operation of the image capturing apparatus 10B of this embodiment, the ND filter process illustrated in FIG. 4 will be described. For an operation the same as that in the first embodiment described above, a description thereof will be omitted.

As illustrated in FIG. 4, an ND filter process of this embodiment is different from the ND filter process of the first embodiment described above in that step S116B is performed instead of step S116. Specifically, step S116B in the ND filter process of this embodiment is different in that a segment region degree determination process, an example of which is illustrated in FIG. 10, is performed instead of the segment region degree determination process (see FIG. 8) in step S116 in the ND filter process of the first embodiment described above.

Figure 10:
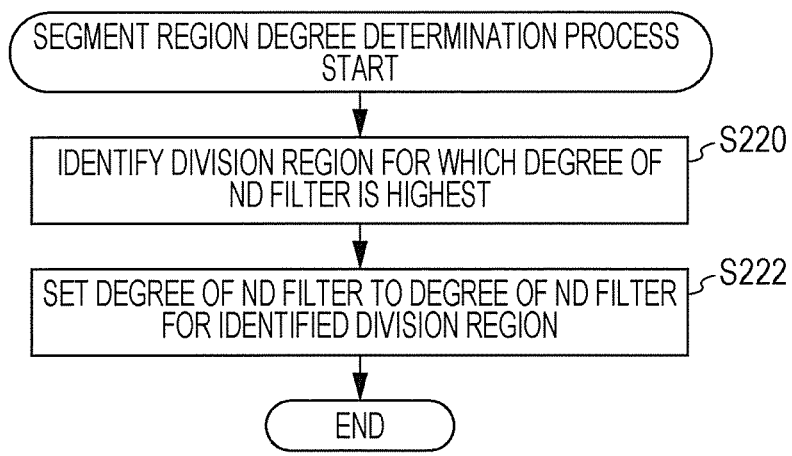
FIG. 10 is a flowchart illustrating an example flow of a segment region degree determination process according to the third embodiment.

In this embodiment, in step S220 in FIG. 10, the CPU 74 identifies a division region for which the degree of the ND filter 80 is highest among the division regions associated with the selected region.

In the next step S222, the CPU 74 derives the degree of the ND filter 80 for the identified division region as the degree of the ND filter 80 for the selected region as in step S204 (see FIG. 8) in the segment region degree determination process of the first embodiment, and thereafter, the segment region degree determination process of this embodiment ends, and the flow proceeds to step S118 in the ND filter process.

As described above, in the image capturing apparatus 10B of this embodiment, in the segment region degree determination process, the CPU 74 determines the degree of the ND filter 80 for the selected region in accordance with the degrees of the ND filter 80 for the division regions in the selected region. Therefore, as in the image capturing apparatus 10 of the first embodiment, exposure control suitable to the photographic subject can be performed.

With the image capturing apparatus 10B of this embodiment, the processing speed of the segment region degree determination process can be further increased and, for example, can be made higher than the processing speed of the segment region degree determination process (see FIG. 8) in the first example and that of the segment region degree determination process (see FIG. 9) in the second embodiment.

In this embodiment, the form has been described in which, among the plurality of division regions associated with the selected region, a division region for which the degree of the ND filter 80 is highest is identified, and the degree of the ND filter 80 for the selected region is set to the degree of the ND filter 80 for the identified division region; however, the form need not be employed. For example, a division region for which the degree of the ND filter 80 is lowest may be identified, and the degree of the ND filter 80 for the selected region may be set to the degree of the ND filter 80 for the identified division region. In this case, a blocked-up-shadows suppression effect is enhanced.

Fourth Embodiment

In the first embodiment described above, the form has been described in which the resolution with which the CPU 74 controls the exposure is fixed. In this embodiment, a form will be described in which the resolution with which the CPU 74 controls the exposure is made variable. In this embodiment, components the same as those described in the first embodiment described above are assigned the same reference numerals, and descriptions thereof will be omitted.

For example, as illustrated in FIG. 1 to FIG. 3, an image capturing apparatus 10C of this embodiment is different from the image capturing apparatus 10 of the first embodiment described above in that the image capturing apparatus 10C has an image capturing apparatus main body 12C instead of the image capturing apparatus main body 12.

For example, as illustrated in FIG. 3, the image capturing apparatus main body 12C is different from the image capturing apparatus main body 12 in that the image capturing apparatus main body 12C has a control unit 46C instead of the control unit 46. The control unit 46C is different from the control unit 46 in that the control unit 46C has a secondary storage unit 78C instead of the secondary storage unit 78.

For example, as illustrated in FIG. 3, the secondary storage unit 78C is different from the secondary storage unit 78 in that the secondary storage unit 78C stores an ND filter process program 79C instead of the ND filter process program 79. The CPU 74 reads from the secondary storage unit 78C and loads to the primary storage unit 76 the ND filter process program 79C, and performs an ND filter process illustrated in FIG. 11 in accordance with the loaded ND filter process program 79C. The CPU 74 executes the ND filter process program 79C to thereby function as the control unit of the present disclosure.

Now, as an operation of the image capturing apparatus 10C of this embodiment, the ND filter process illustrated in FIG. 11 will be described. For an operation the same as that in the first embodiment described above, a description thereof will be omitted.

Figure 11:
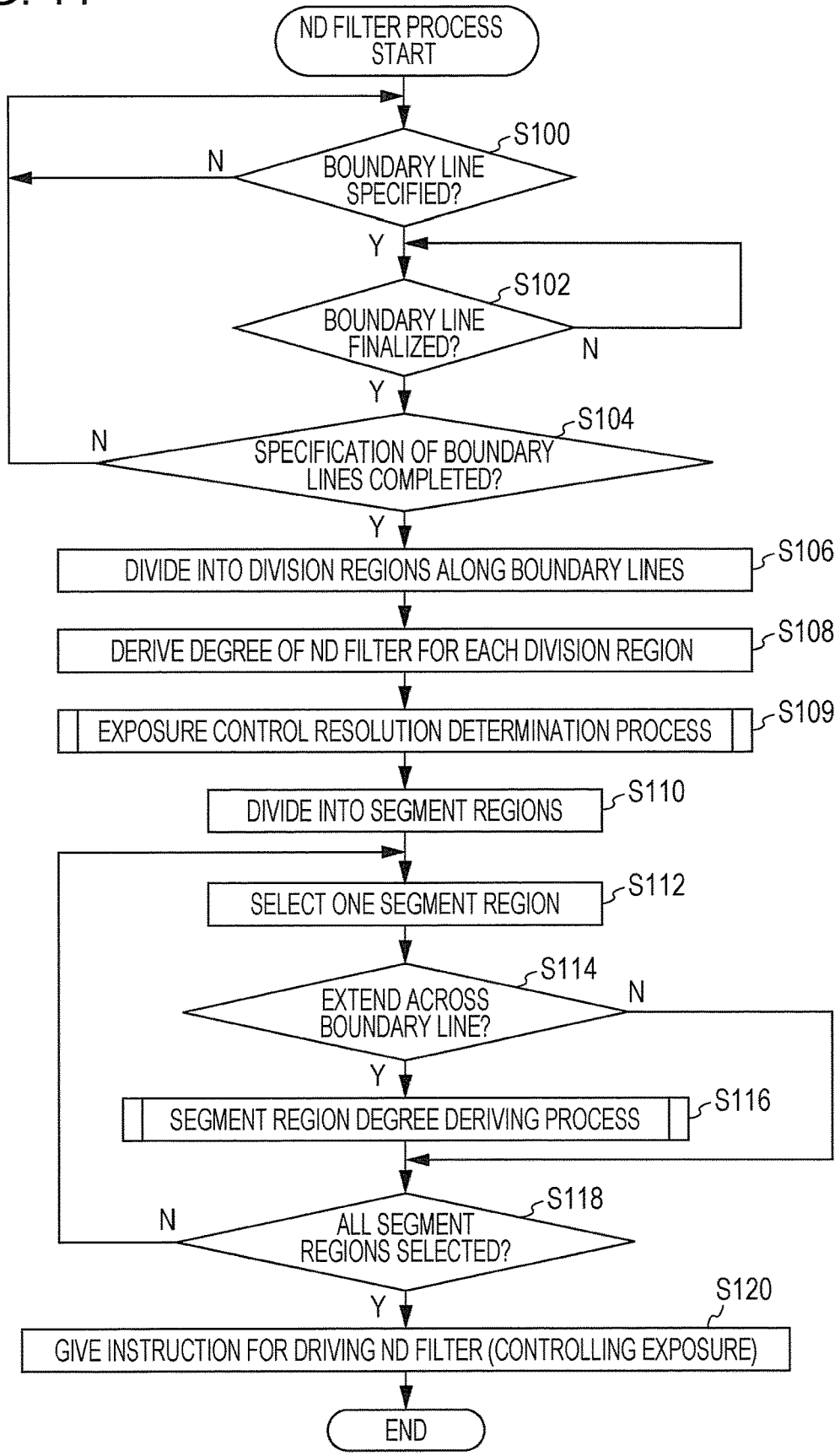
FIG. 11 is a flowchart illustrating an example flow of an ND filter process according to the fourth embodiment.

As illustrated in FIG. 11, the ND filter process of this embodiment is different from the ND filter process of the first embodiment described above in that the process in step S109 is performed between step S108 and step S110.

Figure 12:
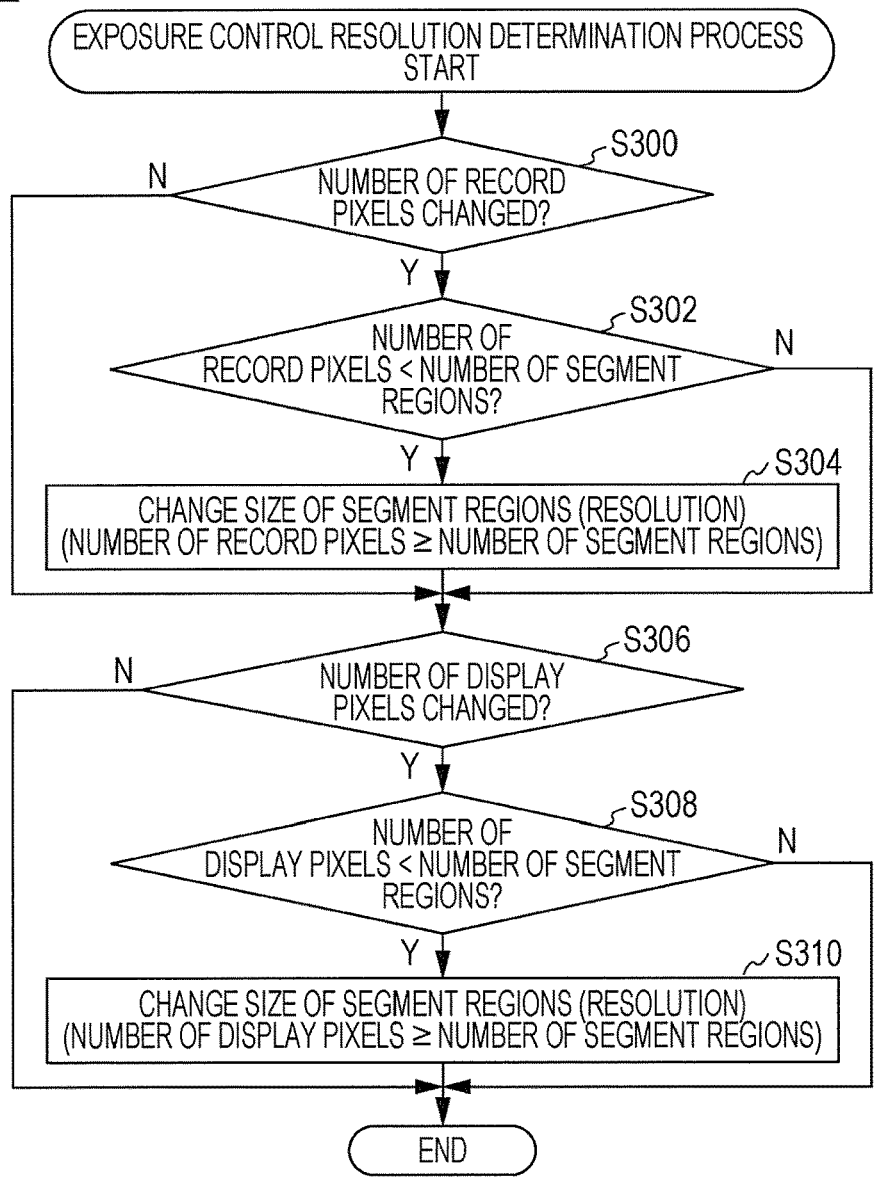
FIG. 12 is a flowchart illustrating an example flow of an exposure control resolution determination process according to the fourth embodiment.

In the image capturing apparatus 10C of this embodiment, the resolution with which the CPU 74 controls the exposure is variable, and therefore, as illustrated in FIG. 11, in step S109 in the ND filter process, the CPU 74 performs an exposure control resolution determination process, an example of which is illustrated in FIG. 12.

In the image capturing apparatus 10C of this embodiment, the number of pixels (hereinafter referred to as "the number of record pixels") of an image that is recorded to the memory card 66 and the number of pixels (hereinafter referred to as "the number of display pixels") of the live preview image 100 that is displayed on the touch panel display 29 can be changed in accordance with a specification given by the user. The initial value of the number of record pixels and that of the number of display pixels are determined in advance. As the initial value of the resolution with which the CPU 74 controls the exposure, a resolution equal to or lower than the initial value of the number of record pixels and equal to or lower than the initial value of the number of display pixels is determined in advance. The resolution with which the CPU 74 controls the exposure is equal to or lower than the resolution of the ND filter 80.

In step S300 in FIG. 12, the CPU 74 determines whether the number of record pixels is changed in accordance with a specification given by the user. In a case where the number of record pixels is not changed, that is, the number of record pixels remains equal to the initial value, the result of determination in step S300 is negative, and the flow proceeds to step S306. On the other hand, in a case where the number of record pixels is changed, the result of determination in step S300 is positive, and the flow proceeds to step S302.

In step S302, the CPU 74 determines whether the number of the segment regions 130 is larger than the number of record pixels. In this embodiment, the resolution with which the CPU 74 controls the exposure is variable as described above, and therefore, the number of the segment regions 130 is also made variable in accordance with the resolution with which the CPU 74 controls the exposure. As the resolution with which the CPU 74 controls the exposure increases, the number of the segment regions 130 increases, and the size of each segment region 130 decreases. Accordingly, the state where the number of the segment regions 130 is larger than the number of record pixels is a state where the resolution with which the CPU 74 controls the exposure is higher than the resolution with which an image is recorded to the memory card 66.

In a case where the number of the segment regions 130 is equal to or smaller than the number of record pixels, in other words, in a case where the resolution with which the CPU 74 controls the exposure is equal to or lower than the resolution with which an image is recorded to the memory card 66, the result of determination in step S302 is negative, and the flow proceeds to step S306.

On the other hand, in a case where the number of the segment regions 130 is larger than the number of record pixels, in other words, in a case where the resolution with which the CPU 74 controls the exposure is higher than the resolution with which an image is recorded to the memory card 66, the result of determination in step S302 is positive, and the flow proceeds to step S304.

In step S304, the CPU 74 makes a change so as to decrease the number (or increase the size) of the segment regions 130, thereby making a change so as to decrease the resolution with which the CPU 74 controls the exposure. In this embodiment, for example, the CPU 74 changes the number of the segment regions 130 to a number equal to or smaller than the number of record pixels. A specific amount by which the number of the segment regions 130 is decreased, in other words, a specific degree to which the resolution with which the CPU 74 controls the exposure is decreased, is not specifically limited and may be determined in advance. For example, it may be determined that the number of the segment regions 130 is decreased to, for example, 90% of the number of record pixels or less.

In the next step S306, the CPU 74 determines whether the number of display pixels is changed in accordance with an instruction given by the user. In a case where the number of display pixels is not changed, that is, the number of display pixels remains equal to the initial value, the result of determination in step S306 is negative, and the exposure control resolution determination process ends. On the other hand, in a case where the number of display pixels is changed, the result of determination in step S306 is positive, and the flow proceeds to step S308.

In step S308, the CPU 74 determines whether the number of the segment regions 130 is larger than the number of display pixels. The state where the number of the segment regions 130 is larger than the number of display pixels is a state where the resolution with which the CPU 74 controls the exposure is higher than the resolution with which the live preview image 100 is displayed on the touch panel display 29.

In a case where the number of the segment regions 130 is equal to or smaller than the number of display pixels, in other words, the resolution with which the CPU 74 controls the exposure is equal to or lower than the resolution with which the live preview image 100 is displayed on the touch panel display 29, the result of determination in step S308 is negative, and the exposure control resolution determination process ends.

On the other hand, in a case where the number of the segment regions 130 is larger than the number of display pixels, in other words, the resolution with which the CPU 74 controls the exposure is higher than the resolution with which the live preview image 100 is displayed on the touch panel display 29, the result of determination in step S308 is positive, and the flow proceeds to step S310.

In step S310, the CPU 74 makes a change so as to decrease the number (or increase the size) of the segment regions 130, thereby making a change so as to decrease the resolution with which the CPU 74 controls the exposure, and thereafter, the exposure control resolution determination process ends, and the flow proceeds to step S110 in the ND filter process illustrated in FIG. 11. In this embodiment, for example, the CPU 74 makes the number of the segment regions 130 equal to or lower than the number of display pixels. A specific amount by which the number of the segment regions 130 is decreased, in other words, a specific degree to which the resolution with which the CPU 74 controls the exposure is decreased, is not specifically limited and may be determined in advance. For example, it may be determined that the number of the segment regions 130 is decreased to, for example, 90% of the number of display pixels or less.

In this embodiment, as described above, in step S109 in the ND filter process, the exposure control resolution determination process is performed so that the number of the segment regions 130 divided by the CPU 74 is set to a number equal to or smaller than the number of record pixels and equal to or smaller than the number of display pixels. Accordingly, the resolution with which the CPU 74 controls the exposure is equal to or lower than the resolution with which an image is recorded to the memory card 66 and is equal to or lower than the resolution with which the live preview image 100 is displayed on the touch panel display 29.

In the next step S110 in the ND filter process (see FIG. 11), the CPU 74 divides the live preview image 100 into the plurality of segment regions 130 in accordance with the size (or the number) of the segment regions 130 determined in the exposure control resolution determination process described above.

As described above, in the image capturing apparatus 10C of this embodiment, the CPU 74 performs the segment region degree determination process as in the image capturing apparatus 10 of the first embodiment, and therefore, exposure control suitable to the photographic subject can be performed as in the first embodiment.

In the image capturing apparatus 10C of this embodiment, the CPU 74 performs the exposure control resolution determination process to determine the number of the segment regions 130, namely, the degree of the ND filter 80, which is the resolution with which the exposure is controlled. Accordingly, the number of the segment regions 130 is made equal to or smaller than the number of record pixels and equal to or smaller than the number of display pixels. Therefore, the number of the segment regions 130 (the resolution with which the exposure is controlled) can be made appropriate, and the processing load of the CPU 74 can be reduced. Further, in the image capturing apparatus 10C of this embodiment, control is performed such that a plurality of segment regions are not included per record pixel and per display pixel. Accordingly, extra processing can be reduced.

With the image capturing apparatus 10C of this embodiment, the degree to which the number of the segment regions 130 is decreased is made appropriate, and therefore, a decrease in the image quality of the displayed image and the recorded image can be suppressed.

In this embodiment, the form has been described in which the number of the segment regions 130 is made equal to or smaller than the number of record pixels and equal to or smaller than the number of display pixels; however, the number of the segment regions 130 is not limited to that in this embodiment. For example, a form may be employed in which the number of the segment regions 130 needs to be equal to or smaller than the number of record pixels or a form may be employed in which the number of the segment regions 130 needs to be equal to or smaller than the number of display pixels.

For convenience of description, the image capturing apparatuses 10, 10A, 10B, and 10C are hereinafter referred to as "image capturing apparatus" without the reference numerals in a case where the image capturing apparatuses need not be distinguished from each other. For convenience of description, the image capturing apparatus main bodies 12, 12A, 12B, and 12C are hereinafter referred to as "image capturing apparatus main body" without the reference numerals in a case where the image capturing apparatus main bodies need not be distinguished from each other. For convenience of description, the secondary storage units 78, 78A, 78B, and 78C are hereinafter referred to as "secondary storage unit" without the reference numerals in a case where the secondary storage units need not be distinguished from each other. Further, for convenience of description, in a case where the ND filter process programs 79, 79A, 79B, and 79C are collectively referred to, the ND filter process programs are referred to as "ND filter process program" without the reference numerals.

In the above-described embodiments, the form has been described in which the CPU 74 uses the ND filter 80 and the ND filter driving unit 82 to control the degree (light transmittance) of the ND filter 80, thereby controlling the exposure; however, the form for controlling the exposure by the ND filter process is not limited to this. For example, a form may be employed in which the CPU 74 controls the image signal processing circuit 52 to control the gains of image signals output from the imaging device 22, thereby performing the ND filter process to control the exposure. Further, for example, a form may be employed in which the CPU 74 controls the shutter speed, thereby performing the ND filter process to control the exposure.

In the above-described embodiments, the form has been described in which the live preview image 100 is divided into a plurality of division regions along boundary lines specified by the user; however, the method for dividing the live preview image 100 into a plurality of division regions is not specifically limited. For example, a form may be employed in which a predetermined brightness is used as a threshold value, and the CPU 74 divides the live preview image 100 into a plurality of division regions on the basis of the brightness of the live preview image 100.

In the above-described embodiments, the form has been described in which the degree of the ND filter 80 for a selected region is determined in accordance with information about all division regions corresponding to the selected region to control the exposure; however, the form is not specifically limited as long as the exposure is controlled in accordance with information about at least one division region.

In the above-described embodiments, the case where the shape of the segment regions 130 is a rectangular shape has been described; however, the shape of the segment regions 130 is not limited as long as the shape is determined in advance in accordance with the resolution or the like of the ND filter 80, as described above. For example, the shape may be a polygonal shape, such as a hexagonal shape. In a case where the shape of the segment regions 130 is set to a shape determined in advance in accordance with the resolution or the like of the ND filter 80, the processing load of the CPU 74 can be reduced.

Figure 13:
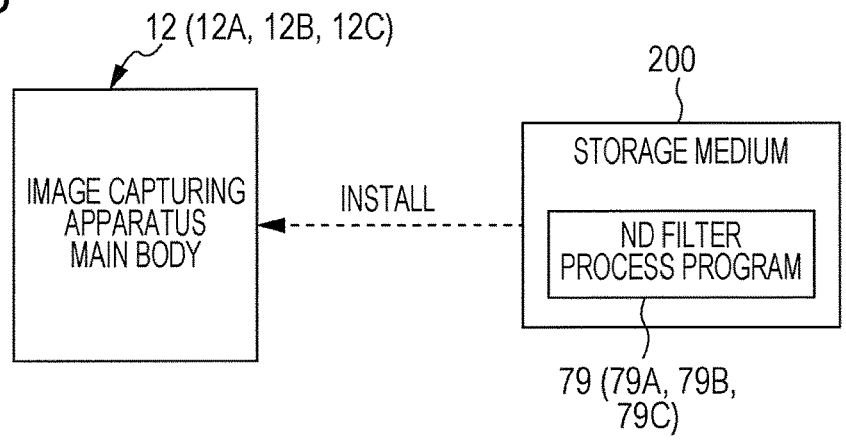
FIG. 13 is a schematic diagram illustrating an example form in which an ND filter process program according to the first to fourth embodiments is installed on an image capturing apparatus main body from a storage medium in which the ND filter process program is stored.

In the above-described embodiments, the example case where the ND filter process program is read from the secondary storage unit has been described; however, the ND filter process program need not be stored in the secondary storage unit at the beginning. For example, as illustrated in FIG. 13, the ND filter process program may be first stored in advance in any portable storage medium 200, such as an SSD (solid state drive), a USB (universal serial bus) memory, or a CD-ROM (compact disc read-only memory). In this case, the ND filter process program stored in the storage medium 200 is installed on the image capturing apparatus main body, and the installed ND filter process program is executed by the CPU 74.

Alternatively, the ND filter process program may be stored in advance in a storage unit of another computer, server apparatus, or the like connected to the image capturing apparatus main body via a communication network (not illustrated), and the ND filter process program may be downloaded in response to a request from the image capturing apparatus main body. In this case, the downloaded ND filter process program is executed by the CPU 74.

The ND filter process described in the above-described embodiments is only an example. Therefore, an unnecessary step may be deleted, a new step may be added, or the order of processes may be changed without departing from the spirit, as a matter of course.

In the above-described embodiments, the example case where the ND filter process is implemented by using a software configuration using a computer has been described; however, the technique of the present disclosure is not limited to this. For example, instead of the software configuration using a computer, the ND filter process may be performed by using only a hardware configuration, such as an FPGA (field-programmable gate array) or an ASIC (application specific integrated circuit). Alternatively, the ND filter process may be performed by using a configuration obtained by combining the software configuration and the hardware configuration.

From the above descriptions, an image capturing apparatus described in annex 1 below can be grasped.

Annex 1

An image capturing apparatus including:

an image capturing unit that includes an imaging device and outputs an image signal obtained by image capturing of a photographic subject by the imaging device through an image capturing optical system;

a control processor that, in a case of controlling an exposure for each of three or more division regions obtained by dividing an image represented by the image signal and in a case of dividing the image into a plurality of segment regions that are different from the division regions and among which a segment region extends across a boundary between some of the division regions, controls an exposure of the segment region in accordance with information about at least one division region among the some of the division regions over which the segment region extends; and a display unit that displays the image for which the exposure is controlled by the control unit.

All documents, patent applications, and technical standards described in this specification are incorporated herein by reference to the same extent as in a case where the documents, patent applications, and technical standards are specifically and individually described as being incorporated herein by reference.

REFERENCE SIGNS LIST 10, 10A, 10B, 10C image capturing apparatus
12, 12A, 12B, 12C image capturing apparatus main body
13, 15 mount
14 image capturing lens
16 focus ring
18 lens unit
19 aperture diaphragm
20 focus lens
22 imaging device
22A photosensitive surface
24 dial
26 release button
28 display
29 touch panel display
30 cross key
32 MENU/OK key
34 BACK/DISP button
36 viewfinder
38 touch panel
40 control device
42 first mirror
44 second mirror
46, 46A, 46B, 46C control unit
48 mirror driving unit
50 imaging device driver
52 image signal processing circuit
54 image memory
56 image processing unit
58 display control unit
60 accepting I/F
62 accepting device
64 medium I/F
66 memory card
72 external I/F
74 CPU
76 primary storage unit
78, 78A, 78B, 78C secondary storage unit
79, 79A, 79B, 79C ND filter process program
80 ND filter
81 bus line
82 ND filter driving unit
100 live preview image
102, 104, 106 image
112, 114, 116 division region
120, 122 boundary line
130, 130A, 130B, 130C, 130D segment region
200 storage medium
α photosensitive surface cover position
β photosensitive surface open position
L1 optical axis

What is claimed is:

1. An image capturing apparatus comprising:

an imaging device driver that outputs an image signal obtained by image capturing of a photographic subject by an imaging device through an image capturing optical system;

a processor configured to, in a case of controlling an exposure for each of three or more division regions obtained by dividing an image represented by the image signal and in a case of dividing the entire image into a plurality of segment regions that are different from the division regions, control an exposure of a first segment region among the plurality of segment regions in accordance with information about at least one division region among the some of the division regions over which the segment region extends, wherein the first segment region extends across a boundary between some of the division regions; and a display that displays the image for which the exposure is controlled by the processor.

2. The image capturing apparatus according to claim 1, wherein the processor further configured to perform control to record an image signal representing the image obtained by controlling the exposure to a memory with a predetermined resolution, and the segment regions have a size that corresponds to at least one of the number of pixels of the image displayed on the display or the number of pixels of the image recorded to the memory.

3. The image capturing apparatus according to claim 2, wherein the number of the segment regions is a number equal to or smaller than at least one of the number of pixels of the image displayed on the display or the number of pixels of the image recorded to the memory.

4. The image capturing apparatus according to claim 1, wherein the size of the segment regions is a size determined in accordance with a resolution that is used in a case where the processor controls the exposure.

5. The image capturing apparatus according to claim 2, wherein the size of the segment regions is a size determined in accordance with a resolution that is used in a case where the processor controls the exposure.

6. The image capturing apparatus according to claim 3, wherein the size of the segment regions is a size determined in accordance with a resolution that is used in a case where the processor controls the exposure.

7. The image capturing apparatus according to claim 1, wherein the division regions are regions obtained by division based on a brightness of the image.

8. The image capturing apparatus according to claim 2, wherein
the division regions are regions obtained by division based on a brightness of the image.

9. The image capturing apparatus according to claim 3, wherein
the division regions are regions obtained by division based on a brightness of the image.

10. The image capturing apparatus according to claim 4, wherein
the division regions are regions obtained by division based on a brightness of the image.

11. The image capturing apparatus according to claim 5, wherein
the division regions are regions obtained by division based on a brightness of the image.

12. The image capturing apparatus according to claim 6, wherein
the division regions are regions obtained by division based on a brightness of the image.

13. The image capturing apparatus according to claim 1, wherein
the segment regions have a predetermined shape.

14. The image capturing apparatus according to claim 2, wherein
the segment regions have a predetermined shape.

15. The image capturing apparatus according to claim 3, wherein
the segment regions have a predetermined shape.

16. The image capturing apparatus according to claim 1, wherein
the information about the at least one division region is information indicating a characteristic value of brightness.

17. The image capturing apparatus according to claim 1, wherein
the information about the at least one division region is information indicating a degree of exposure.

18. The image capturing apparatus according to claim 1, wherein
the information about the at least one division region is information indicating a number of pixels.

19. A control method for the image capturing apparatus according to claim 1, the control method including a process comprising:
controlling the exposure for each of three or more division regions obtained by dividing the image represented by the image signal obtained by image capturing of the photographic subject by the imaging device through the image capturing optical system;
further dividing the entire image into the plurality of segment regions different from the division regions and, in a case where a first segment region among the plurality of segment regions extends across the boundary between some of the division regions, controlling the exposure of the first segment region in accordance with the information about at least one division region among the some of the division regions over which the segment region extends; and
displaying the image for which the exposure is controlled on the display.

20. A non-transitory computer readable recording medium storing a control program for the image capturing apparatus according to claim 1, the control program causing a computer to perform a process comprising:
controlling the exposure for each of three or more division regions obtained by dividing the image represented by the image signal obtained by image capturing of the photographic subject by the imaging device through the image capturing optical system;
further dividing the entire image into the plurality of segment regions different from the division regions and, in a case where a first segment region among the plurality of segment regions extends across the boundary between some of the division regions, controlling the exposure of the first segment region in accordance with information about at least one division region among the some of the division regions over which the segment region extends; and
displaying the image for which the exposure is controlled on the display.

* * * * *